Feb. 9, 1960 P. F. RENNER 2,924,529
CONFECTION
Filed Feb. 25, 1958
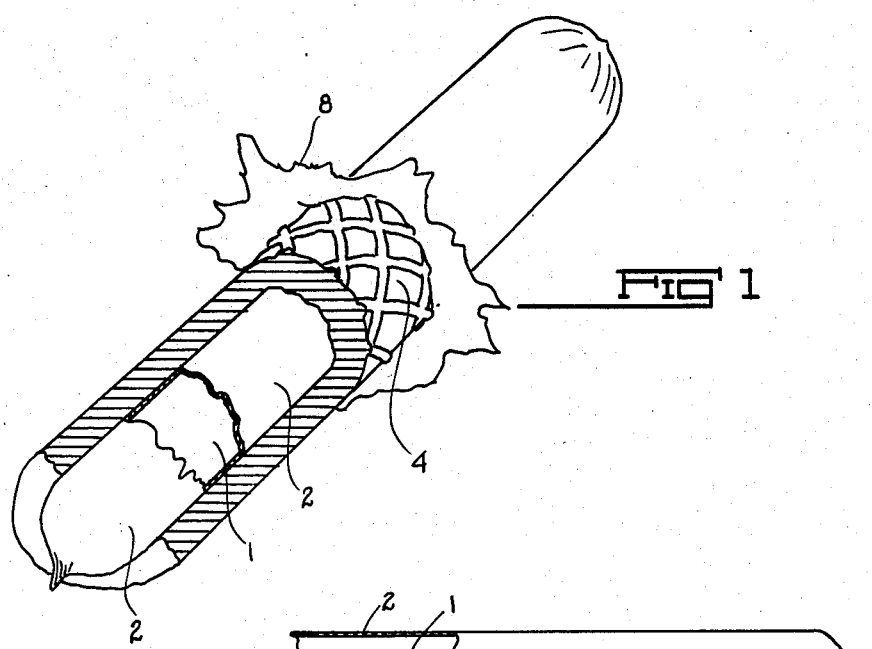
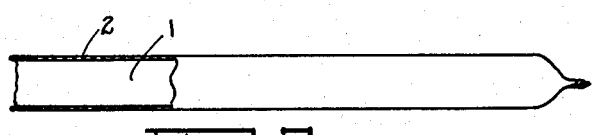
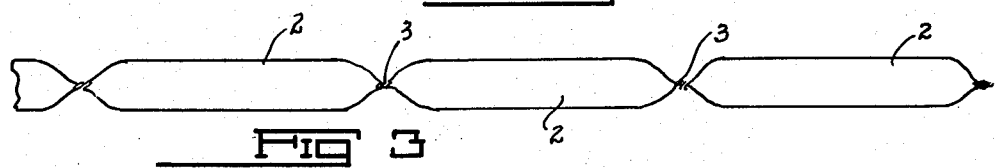
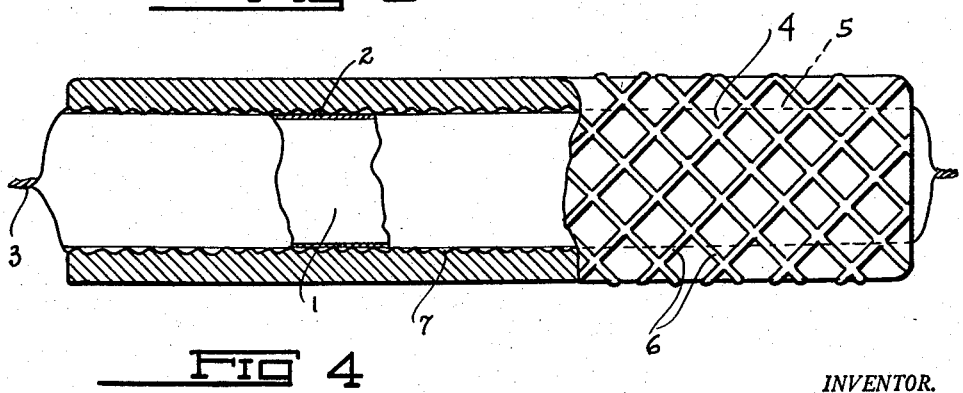
INVENTOR.
PHILIP F. RENNER
BY
Charles Richard Werner
ATTORNEY

United States Patent Office 2,924,529
Patented Feb. 9, 1960

2,924,529

CONFECTION

Philip F. Renner, Chicago, Ill.; Chicago Title and Trust Company, executor of said Philip F. Renner, deceased Application February 25, 1958, Serial No. 717,422

3 Claims. (Cl. 99—137)

This invention relates to a confection comprising a frozen core of cylindrical shape and a hollow outer edible receptacle.

One of the objects of the invention is to provide a confection in which the core of ice cream or the like is preferably formed in an elongated cylindrical shape and is maintained in substantially frozen condition until ready to be eaten, at which time it is inserted in an edible receptacle formed as a hollow cylinder with the interior aperture of the proper size to receive and retain the core until eaten.

Another object of my invention is to provide a confection in the form of a frozen core and an edible cylindrical receptacle for the core, the frozen confection having an edible casing similar to a sausage casing or the like and being insertable in the cylinder shaped receptacle after being frozen.

And one more object of my invention is to form the frozen core in the shape of a frankfurter with either a colored, edible casing on the core tied off at the ends in the same manner as a frankfurter, or a clear, transparent edible casing with the core being colored to simulate a frankfurter, and an edible hollow cylindrical receptacle in which the core may be easily inserted just prior to serving a purchaser.

Another object is to provide a receptacle with internal ribs for aiding in the retention of the core within said receptacle.

Other objects and advantages as well as the manner of forming and dispensing my invention will be better understood by reference to the following description in connection with the accompanying drawing in which:

Fig. 1 is an isometric view of the confection made in accordance with my invention, parts being broken away to better illustrate certain other parts.

Fig. 2 is a reduced elevational view of a casing in which the confection or core is being inserted.

Fig. 3 is a similar view with sections tied off for individual servings.

Fig. 4 is a longitudinal cross sectional view showing the core in the cylinder and parts being broken away to better illustrate certain other parts.

Referring now to the drawing by numerals of reference 1 designates a core comprising a confection such as ice cream, sherbet or the like, formed in an elongated shape very similar to a frankfurter and which may be formed with color added to simulate the color of a frankfurter.

The core may be coated with a colored confection such as chocolate or the like or may be covered with an edible material such as is used with frankfurters and this cover 2 may be clear or colored as desired. As shown in Figs. 2 and 3 the cover may be filled with the confection 1 and tied off or twisted at regular intervals as at 3 to form the string of individual connections which are then kept in a freezing container for shipment or for dispensing.

The receptacle 4 for the core or confection is formed in an elongated cylindrical shape with a hollow opening 5 in which the core 1 may be inserted, the length of the receptacle being approximately that of the core or slightly less. The receptacle may be of the same material as that used for ice cream cones or wafers for ice cream sandwiches.

The outside surface of the receptacle 4 may have any suitable configuration but I have shown it cross ribbed as at 6 for ornamentation as well as ease in gripping the confection and minimizing heat transfer from the hands of the person handling the confection. Internal ribbing 7 may be used to aid in more securely holding the core 1 in the receptacle 4. An external wrapper 8 may be used to cover the entire confection.

It is primarily my idea that in dispensing this confection the frozen cores 1 be kept frozen in a separate container apart from receptacles 4 which need not be frozen. When selling the confections a frozen core is removed from the cold container, a receptacle is removed from the other container and the two are quickly and easily assembled and dispensed. If a wrapper is used on the receptacle it can be almost completely applied except for one end and given a final twist when the core is assembled; or sheets of wrappers can be available and the entire confection rolled up in a sheet and the ends twisted to complete the package.

From the foregoing it will be apparent that I have provided a new and novel frozen confection in the form of a frankfurter. The confection is easily manufactured, is simple to store and to dispense.

Obviously, changes in form, proportion and details of manufacturing may be resorted to without departing from the spirit of my invention and I reserve the right to such changes as come within the scope of this specification and the claims which follow.

What I claim as new and desire to secure by Letters Patent is:

1. In a confection, a frozen core simulating a frankfurter, a receptacle for the core, said receptacle being cylindrical in configuration, a hollow bore in the receptacle snugly receiving the frozen core, and configurations within the bore holding the frozen core therein.

2. In a confection, a frozen core simulating a frankfurter, a receptacle for the core, said receptacle being cylindrical in configuration, a hollow bore in the receptacle snugly receiving the frozen core, and annularly disposed configurations within the bore holding the frozen core therein.

3. In a confection, a frozen core simulating a frankfurter, a hollow cylindrical receptacle for receiving the core, and core retaining means on the inner surface of the hollow cylindrical receptacle.

References Cited in the file of this patent

UNITED STATES PATENTS 2,695,237    Hoff _____ Nov. 23, 1954

FOREIGN PATENTS 22,362    Great Britain _____ 1910